(12) United States Patent
Carroll et al.

(10) Patent No.: US 9,906,090 B2
(45) Date of Patent: Feb. 27, 2018

(54) BLENDER MOTOR HOUSING

(71) Applicant: MOOG INC., East Aurora, NY (US)

(72) Inventors: Matthew A. Carroll, Christiansburg, VA (US); Ronald Flanary, Blacksburg, VA (US); Mohammad Khandan-Barani, Radford, VA (US)

(73) Assignee: Moog Inc., East Aurora, NY (US)

( * ) Notice: Subject to any disclaimer, the term of this patent is extended or adjusted under 35 U.S.C. 154(b) by 299 days.

(21) Appl. No.: 14/772,814

(22) PCT Filed: Mar. 14, 2014

(86) PCT No.: PCT/US2014/027598
§ 371 (c)(1),
(2) Date: Sep. 4, 2015

(87) PCT Pub. No.: WO2014/152669
PCT Pub. Date: Sep. 25, 2014

(65) Prior Publication Data
US 2016/0013700 A1    Jan. 14, 2016

Related U.S. Application Data

(60) Provisional application No. 61/786,768, filed on Mar. 15, 2013.

(51) Int. Cl.
*H02K 5/18* (2006.01)
*A47J 43/046* (2006.01)
(Continued)

(52) U.S. Cl.
CPC ............ *H02K 5/18* (2013.01); *A47J 43/0465* (2013.01); *H02K 5/10* (2013.01); *H02K 7/003* (2013.01)

(58) Field of Classification Search
CPC ........................................................ H02K 5/18
(Continued)

(56) References Cited

U.S. PATENT DOCUMENTS 3,680,984 A * 8/1972 Young ................... F04D 25/026
310/104
3,720,914 A    3/1973 Hallerback
(Continued)

FOREIGN PATENT DOCUMENTS

CN    201658273    12/2010
CN    201888728 U    7/2011
(Continued)

*Primary Examiner* — Jeremy Luks
(74) *Attorney, Agent, or Firm* — Hodgson Russ LLP

(57) ABSTRACT

A magnetic drive assembly includes a housing having a cylindrical end bell portion and a cylindrical hub portion adjacent the end bell portion, wherein the radius of the hub portion is greater than the radius of the end bell portion. One or more mounting tabs extend radially outward from the hub portion. The housing has heat transfer fins associated with the mounting tabs for dissipating heat and structurally supporting the mounting tabs in the manner of a gusset. The heat transfer fins may be arranged on opposite sides of each mounting tab to provide support for the mounting tab in opposite axial directions of the housing. To relieve internal pressure, the housing may have at least one pressure equalization vent allowing passage of gas but not passage of liquid into and out of the housing.

17 Claims, 9 Drawing Sheets

(51) Int. Cl.
*H02K 5/10* (2006.01)
*H02K 7/00* (2006.01)

(58) Field of Classification Search
USPC .................................................. 310/64, 89
See application file for complete search history.

(56) References Cited

U.S. PATENT DOCUMENTS

| | | |
|---|---|---|
| 5,368,390 A | 11/1994 | Gambrill et al. |
| 6,384,494 B1 | 5/2002 | Avidano et al. |
| 6,793,167 B2 | 9/2004 | Karkos, Jr. et al. |
| 8,227,948 B1 | 7/2012 | Fox et al. |
| 8,282,268 B2 | 10/2012 | Karkos, Jr. et al. |
| 2001/0002892 A1 | 6/2001 | Karkos, Jr. et al. |
| 2003/0067228 A1 | 4/2003 | Vanjani |

FOREIGN PATENT DOCUMENTS

| | | |
|---|---|---|
| CN | 202146239 | 2/2012 |
| CN | 102366307 | 3/2012 |
| CN | 202172326 U | 3/2012 |
| CN | 102414962 | 4/2012 |
| CN | 102548783 | 7/2012 |
| CN | 102920333 | 2/2013 |
| JP | 3716127 B2 | 11/2005 |
| WO | 9740569 | 10/1997 |

\* cited by examiner

BLENDER MOTOR HOUSING

CROSS-REFERENCE TO RELATED APPLICATIONS

This application claims priority to U.S. Provisional Application No. 61/786,768 filed on Mar. 15, 2013, the entire disclosure of which is incorporated herein by reference.

FIELD OF THE INVENTION

The present invention relates generally to electric motors, and, more particularly, to water-resistant electric motors.

BACKGROUND OF THE INVENTION

It is known to combine a blender with an ice shaver in a single appliance, as disclosed for example in U.S. Pat. Nos. 6,793,167 and 8,282,268. Such appliances are used in restaurants and bars to produce frozen drinks. The restaurants and bars are often in warm and humid locations where frozen drinks are desirable.

FIGS. 1 and 2 illustrate a combined ice shaver and blender of the prior art. The blender functionality may be provided by a blender cup having an impeller at the bottom of the cup. The impeller may be coupled to a ferrous drive plate rotatably mounted in a base of the blender cup such that the impeller rotates with the drive plate. The blender cup is removably received on top of a magnetic drive of the appliance configured to magnetically drive rotation of the drive plate in the blender cup, thereby causing rotation of the impeller. The magnetic drive may include a brushless d.c. motor having stator windings and a rotor assembly, wherein the rotor assembly includes a ring-shaped drive magnet carried in a hub and configured to magnetically drive rotation of the drive plate in the base of the blender cup. In some embodiments, the drive ring magnet is about five inches in diameter and weighs approximately three pounds. With typical operating speeds varying from 4,000 to 10,000 rpm, the rotating drive ring magnet can exert significant forces on the mounting structures, particularly rapidly varying forces that produce noise and vibrations. Heat and pressure buildup within a housing of the drive motor are concerns during motor operation. The stator windings and sensing electronics for providing motor control feedback must be protected from exposure to liquid, so an open-vented housing is not an available solution for relieving heat and pressure buildup.

What is needed is an improved magnetic drive design capable of dissipating heat and pressure associated with operation of the drive motor.

SUMMARY OF THE INVENTION

The invention provides a magnetic drive assembly characterized by a housing configured to dissipate heat and pressure.

In an embodiment of the invention, the magnetic drive assembly comprises a housing including a cylindrical end bell portion and a cylindrical hub portion at an open end of the end bell portion, wherein the radius of the hub portion is greater than the radius of the end bell portion. One or more mounting tabs extend radially outward from the hub portion, wherein each tab includes a fastener hole. The housing further comprises at least one heat transfer fin contacting the hub portion and the mounting tab.

A stator assembly and a rotor assembly are contained in the housing, with the stator assembly being received in the end bell portion. The rotor assembly includes a hub having a ring-shaped recess located in the hub portion of the housing, and a drive ring magnet is carried in the recess of the hub.

In an embodiment of the invention, a plurality of mounting tabs are provided, and each tab has a plurality of first heat transfer fins having an axially extending edge contacting the hub portion and a plurality of second heat transfer fins having an axially extending edge contacting the end bell portion. Each of the first heat transfer fins may have a radially extending edge contacting the mounting tab, and each of the second heat transfer fins may have a radially extending edge contacting the hub portion and the mounting tab. Each first heat transfer fin may form a gusset support between the hub portion and the mounting tab, and each second heat transfer fin may form a gusset support between the end bell portion and the mounting tab. The first heat transfer fins may be arranged on an opposite side of the mounting tab relative to the second heat transfer fins, whereby the mounting tab is braced in opposite axial directions.

To relieve pressure build-up within the housing, the housing may further comprise at least one pressure equalization vent allowing passage of gas but not passage of liquid into and out of the housing.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
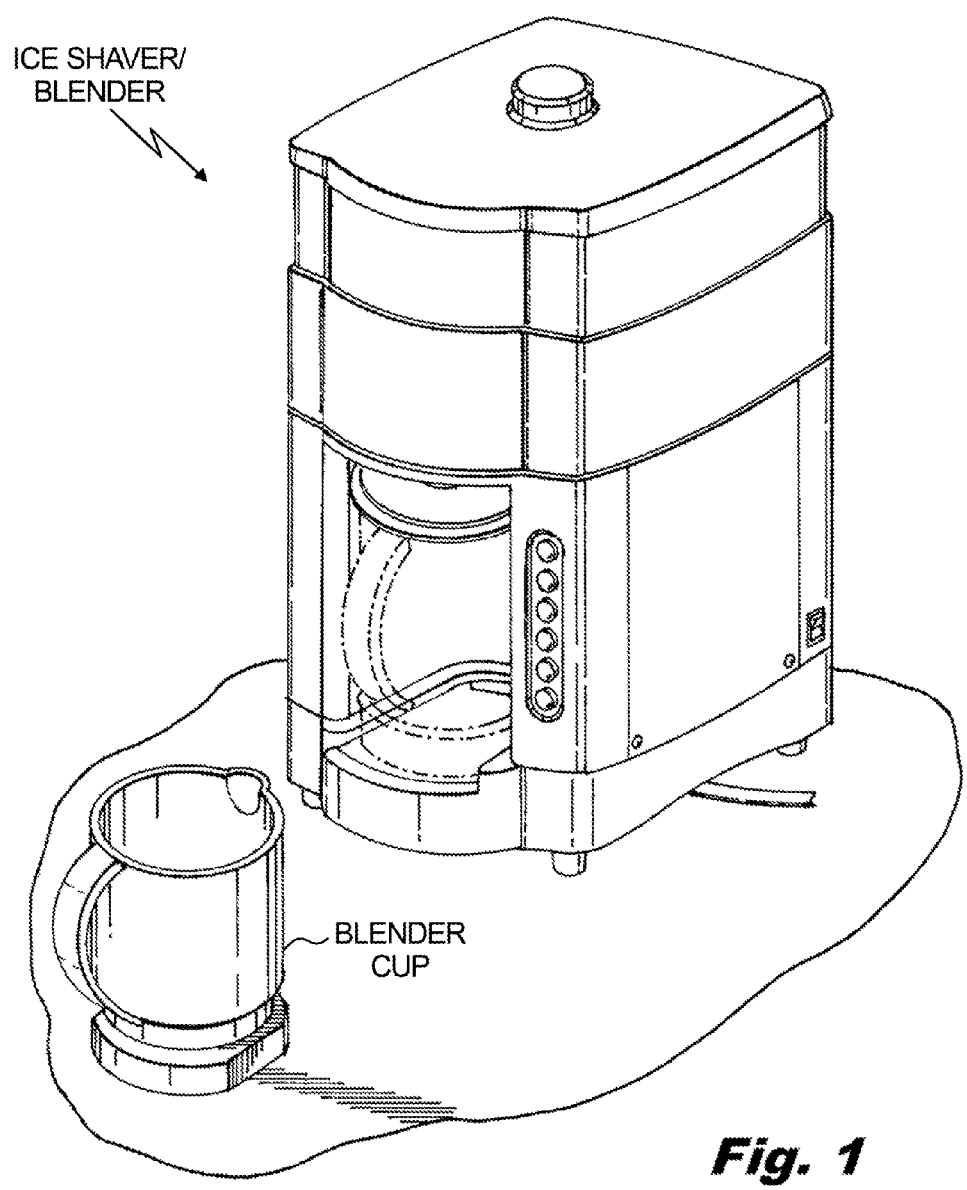
FIG. 1 is a perspective view of a combination ice shaver and blender according to known prior art.
Figure 2:
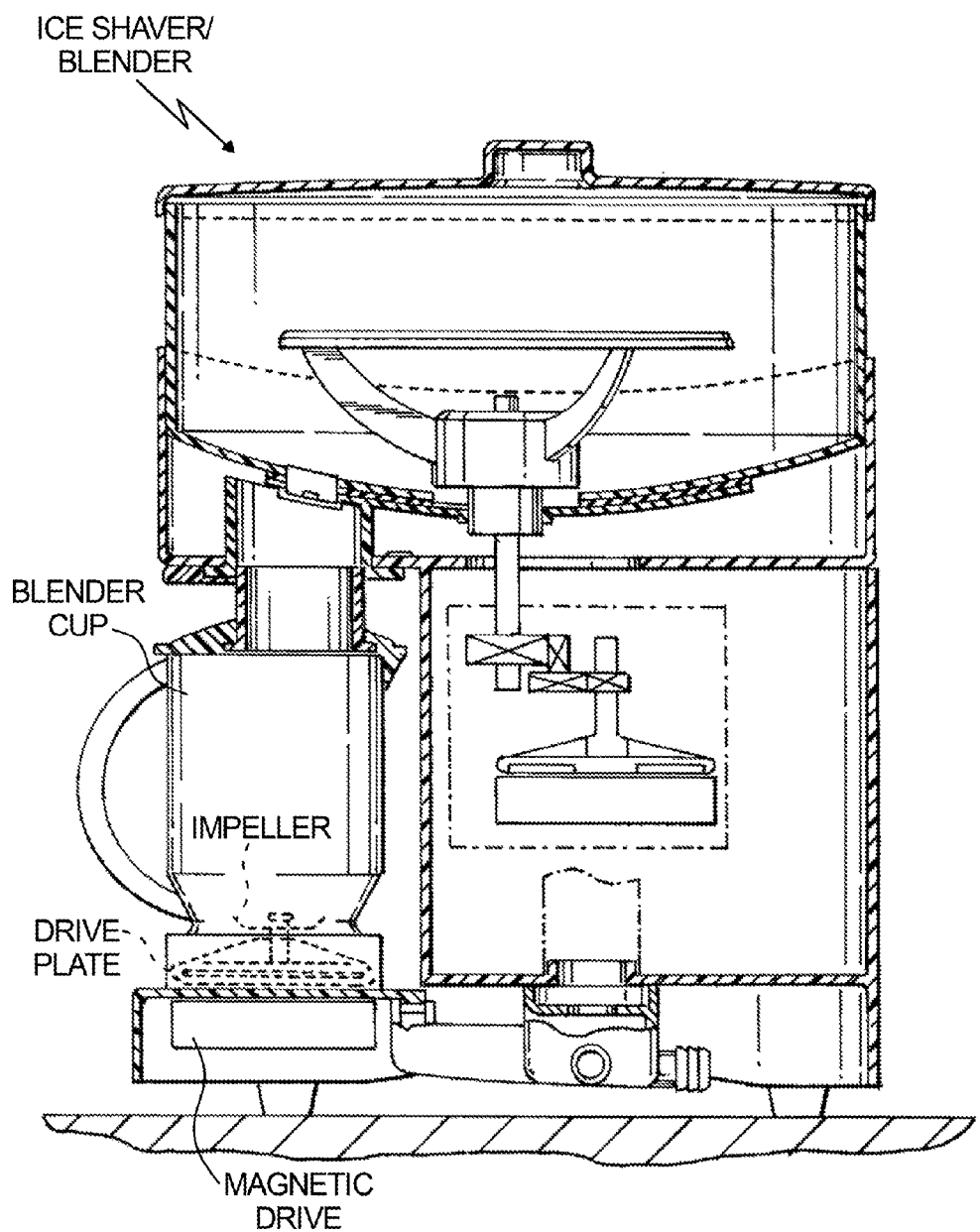
FIG. 2 is a schematic cross-sectional view of the combination ice shaver and blender shown in FIG. 1.
Figure 3:
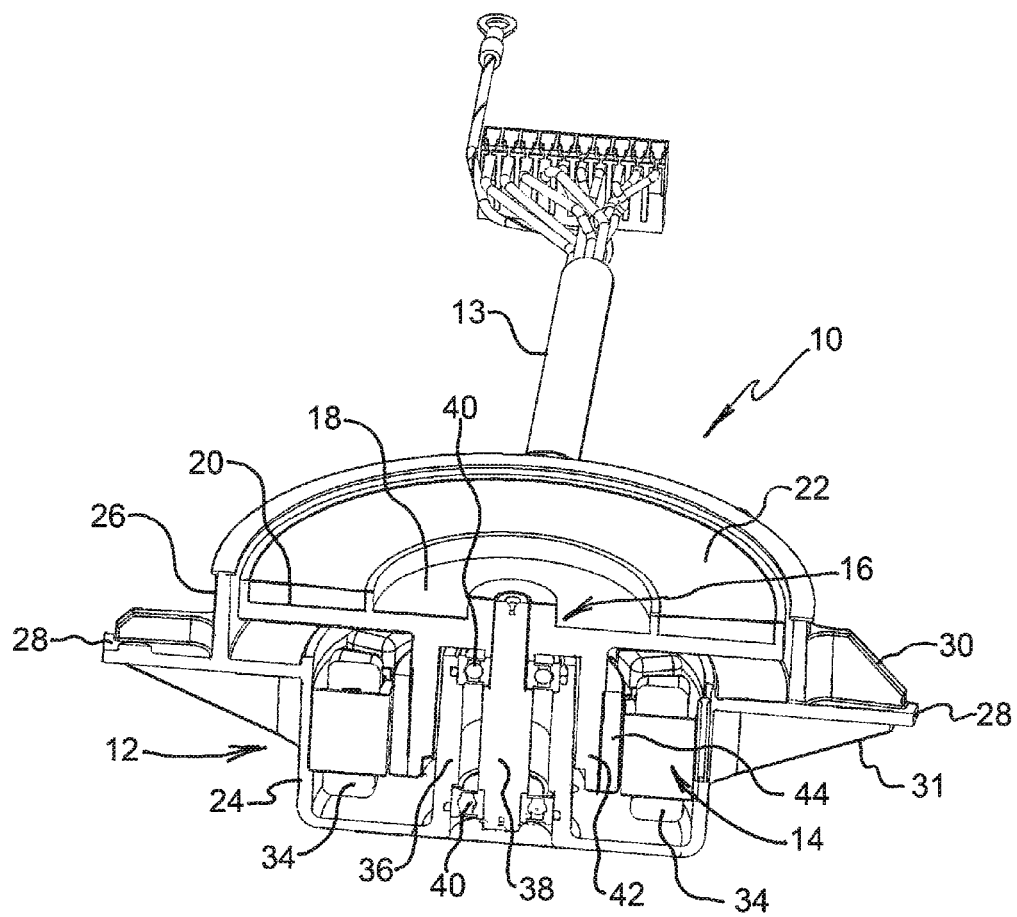
FIG. 3 is a sectioned perspective view of a blender cup magnetic drive formed in accordance with an embodiment of the present invention.
Figure 4:
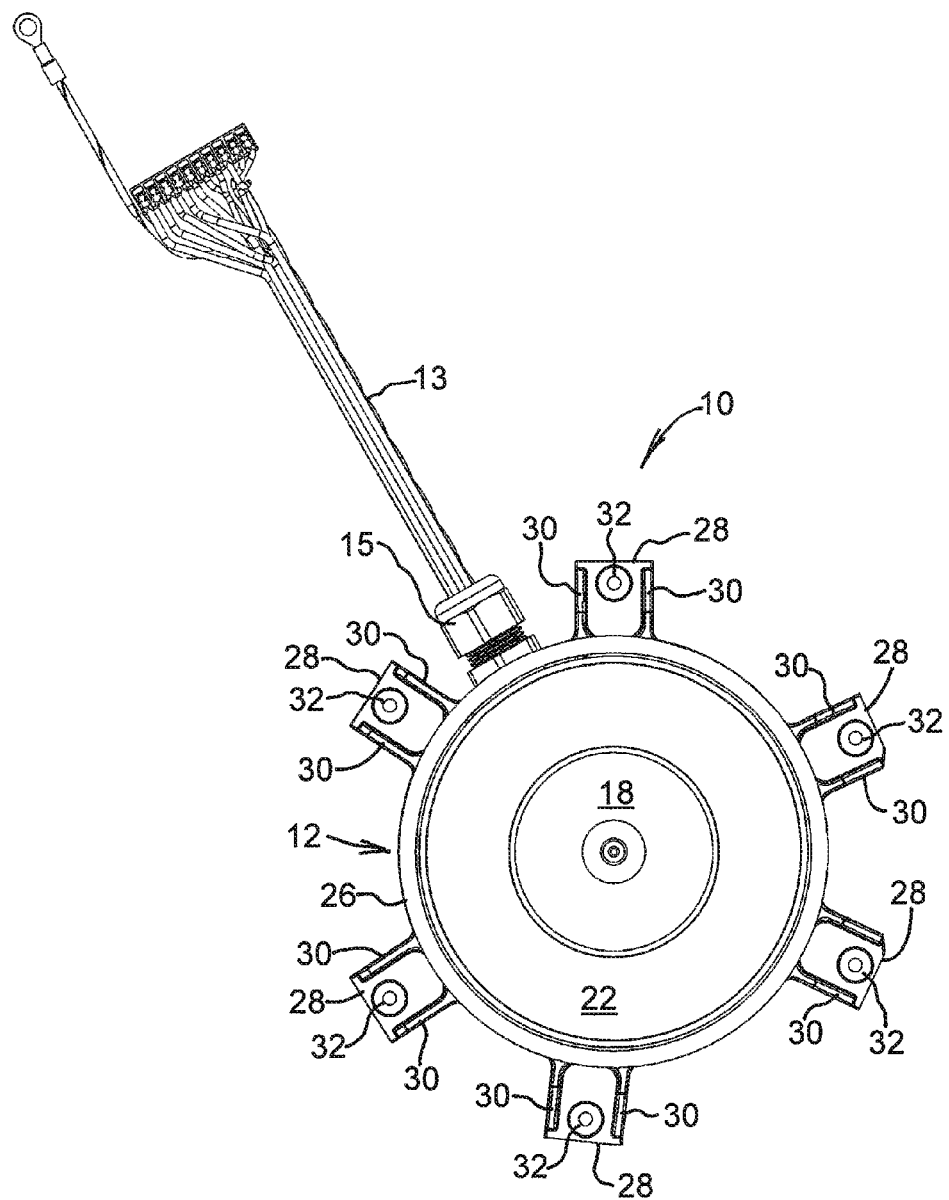
FIG. 4 is a top plan view of the magnetic drive shown in FIG. 3.
Figure 5:
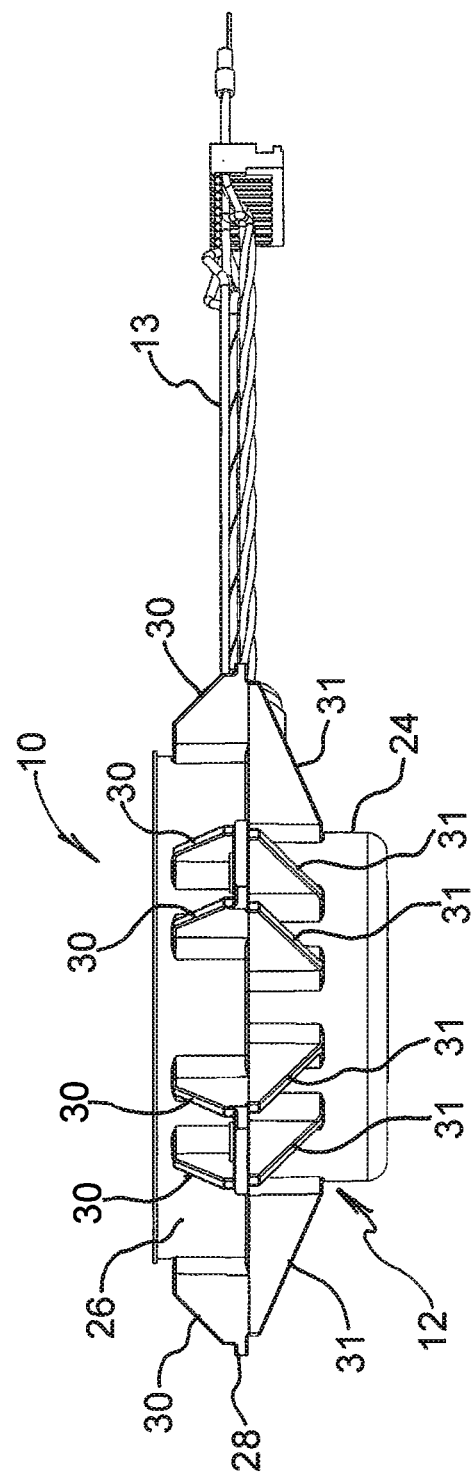
FIG. 5 is a side elevational view of the magnetic drive shown in FIG. 3.

FIGS. 3-9 illustrate a magnetic drive assembly 10 formed in accordance with an embodiment of the present invention. Magnetic drive assembly 10 may be used to magnetically drive rotation of an impeller located in a blender cup positioned on top of the magnetic drive assembly in a blender device.

In the depicted embodiment, magnetic drive assembly 10 generally comprises a housing 12, a stator assembly 14, a rotor assembly 16 including a hub 18, and a drive ring magnet 22 carried in a ring-shaped recess 20 of the hub. An electrical lead bundle 13 enters housing 12 through a sealing grommet 15.

Figure 6:
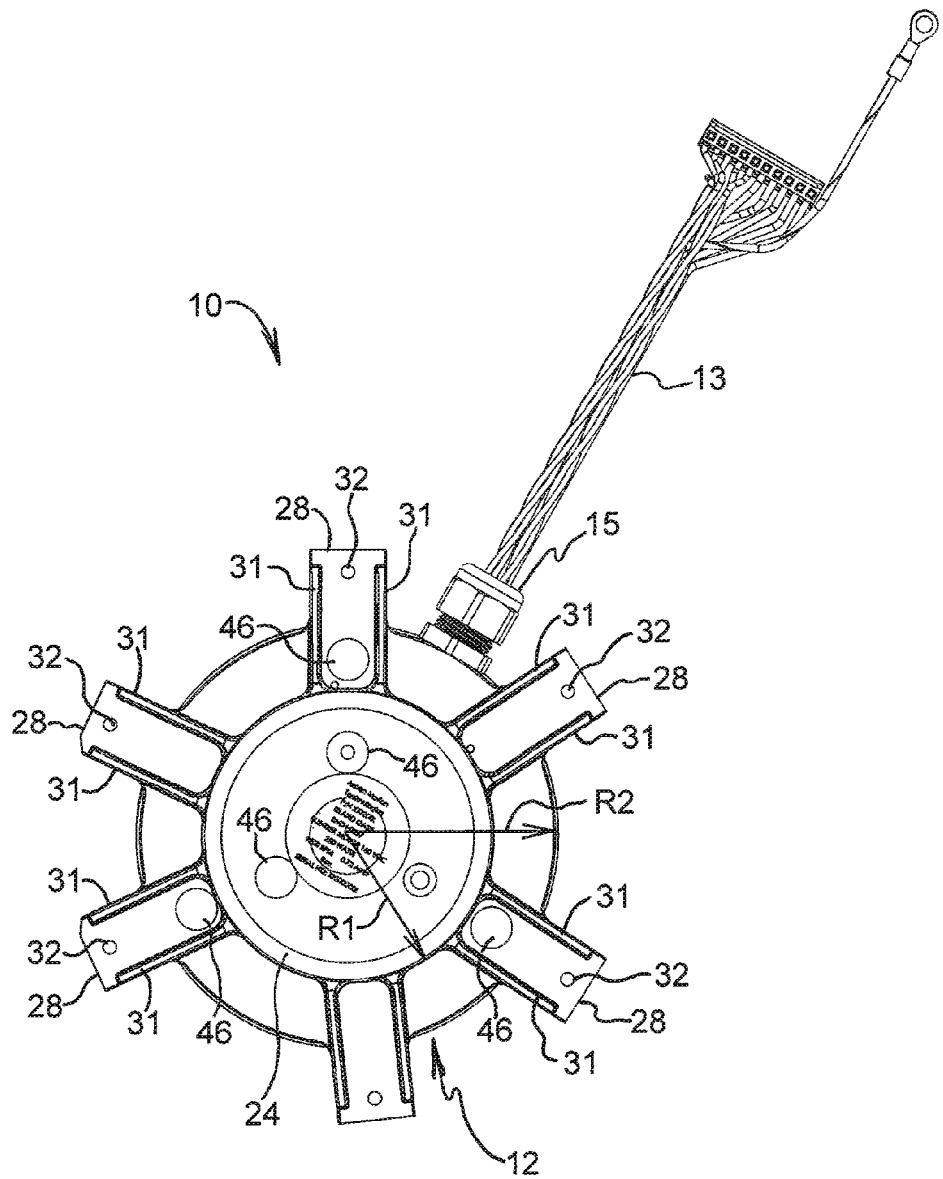
FIG. 6 is a bottom plan view of the magnetic drive shown in FIG. 3.
Figure 7:
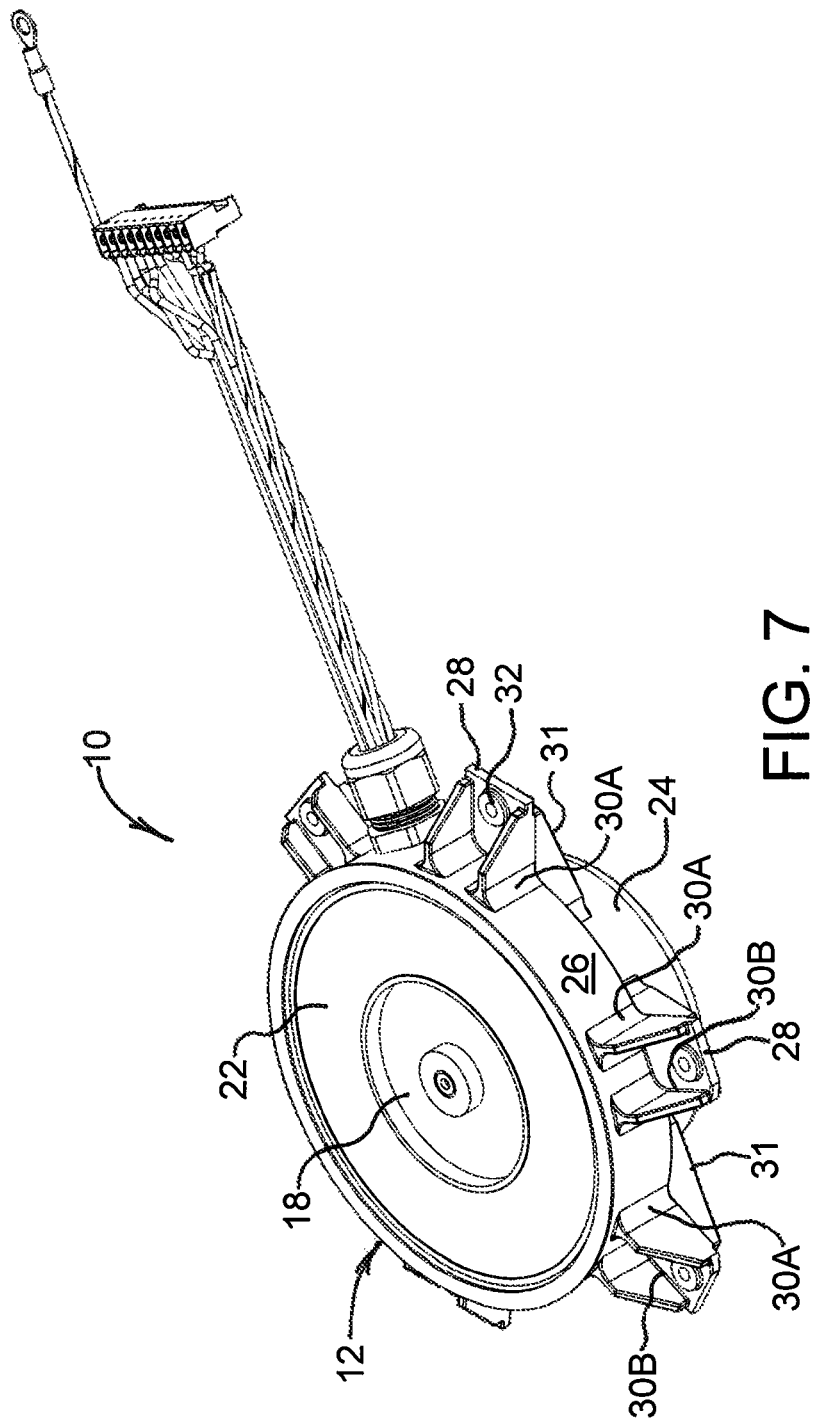
FIG. 7 is a perspective view of the magnetic drive shown in FIG. 3.
Figure 8:
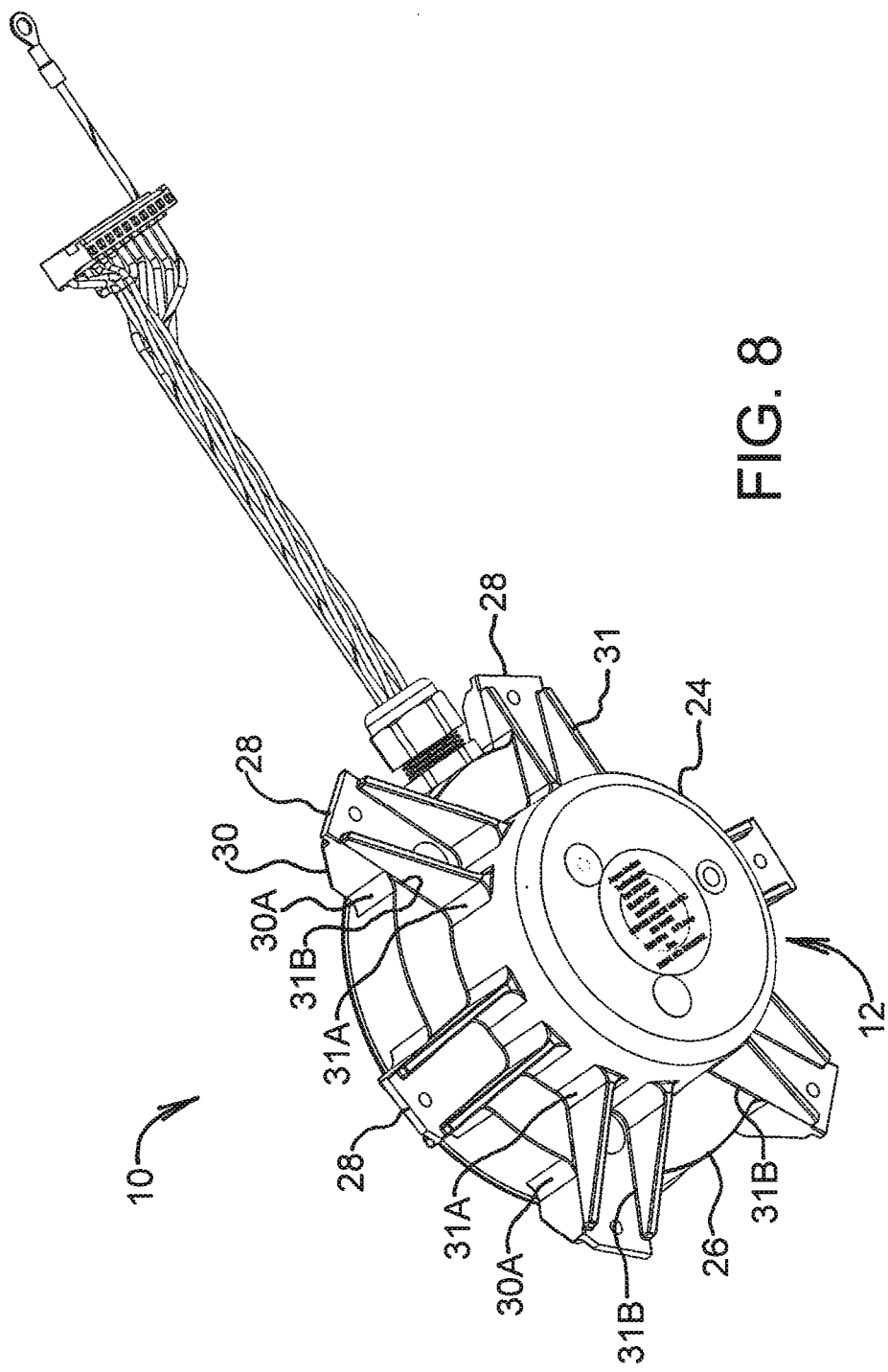
FIG. 8 is another perspective view of the magnetic drive shown in FIG. 3.
Figure 9:
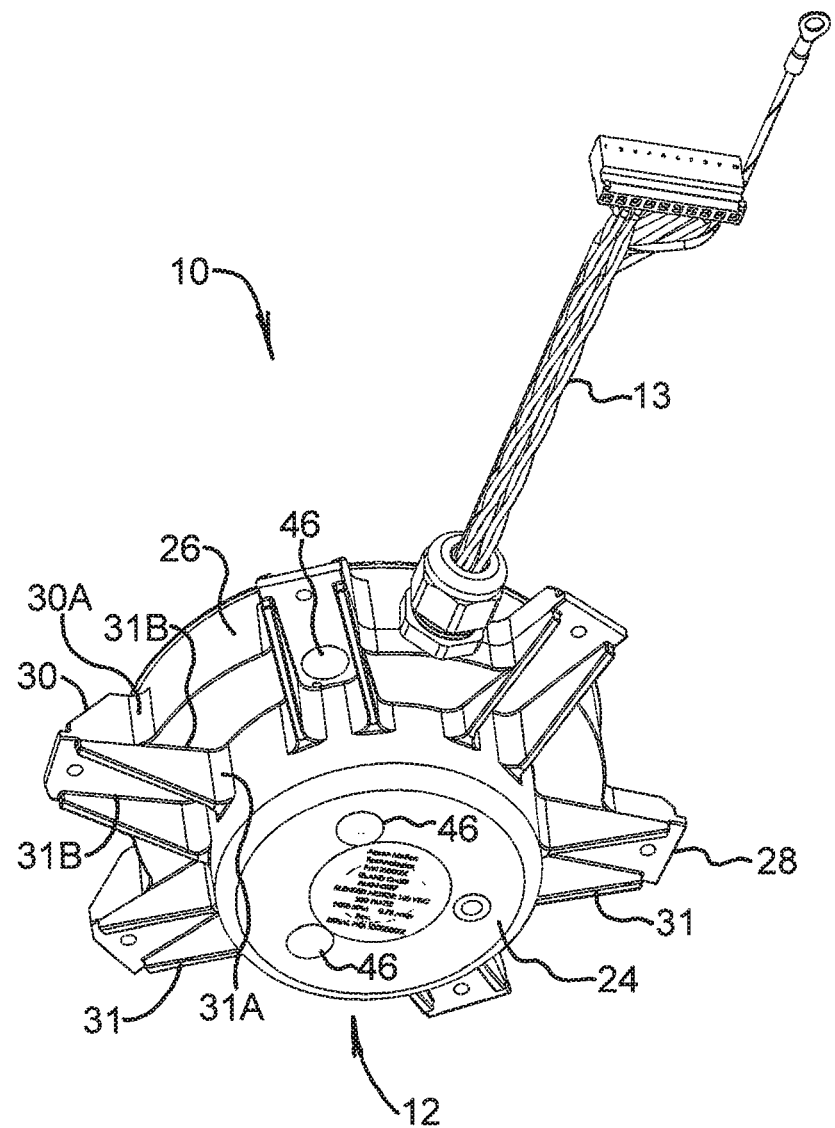
FIG. 9 is a further perspective view of the magnetic drive shown in FIG. 3.

Housing 12 includes a cylindrical end bell portion 24 having a first radius R1, and a cylindrical hub portion 26 at an open end of end bell portion 24 having a second radius R2. Housing 12 further includes a plurality of mounting tabs 28 extending radially outward from hub portion 26, and at least one heat transfer fin 30, 31 contacting hub portion 26 and a mounting tab 28. Each mounting tab 28 may include one or more fastener holes 32. In the depicted embodiment, housing 12 has six mounting tabs 28, however more or fewer mounting tabs may be provided. For example, a single mounting tab 28 may be provided in the form of a continuous annular flange encircling hub portion 26. As shown in FIG. 6, second radius R2 may be greater than first radius R1, resulting in a radial step where end bell portion 24 meets hub portion 26.

Stator assembly 14 is received in end bell portion 24, and includes a plurality of windings 34 angularly spaced about a rotational axis of rotor assembly 16. The end bell portion 24 of housing 12 defines an axially-extending internal sleeve 36 in which a drive shaft 38 of rotor assembly 16 is rotatably mounted by a pair of rotary bearings 40. Hub 18 is fixedly mounted on drive shaft 38, and includes a stem portion 42 fitting with clearance over internal sleeve 36 of housing 12. A rotor ring magnet 44 is fixedly arranged about hub stem portion 42 radially opposite stator windings 34. As will be understood, when stator windings 34 are energized and commutated, rotor assembly 16 including hub 18 will rotate relative to stator assembly 14 and housing 12. As a result, drive ring magnet 22 carried in ring-shaped recess 20 of hub 18 will also rotate to magnetically drive the blender cup impeller.

Heat transfer fins 30, 31 increase the exposed surface area of housing 12 so that heat is more readily dissipated from the housing to surrounding environment. In the depicted embodiment, housing 12 includes a plurality of first heat transfer fins 30 each having an axially extending edge 30A contacting hub portion 26 of housing 12, and a plurality of second heat transfer fins 31 each having an axially extending edge 31A contacting end bell portion 24 of housing 12. The first heat transfer fins 30 each have a radially extending edge 30B contacting the associated mounting tab 28. The second heat transfer fins 31 each have a radially extending edge 31B contacting hub portion 26 and the associated mounting tab 28. First heat transfer fins 30 may be arranged on an opposite side of mounting tab 28 relative to second heat transfer fins 31, thereby providing opposing supports for the mounting tab. In the illustrated exemplary embodiment, the first heat transfer fins 30 may form a gusset support between hub portion 26 and associated mounting tab 28, and the second heat transfer fins 31 may form an opposing gusset support between end bell portion 24 and associated mounting tab 28. Thus, mounting tabs 28 are supported in opposite axial directions.

Housing 12 may be formed from a strong material having relatively high thermal conductivity. Aluminum is considered a suitable material for housing 12, however other materials may be used.

In order to prevent pressure buildup within housing 12 associated with heat generated by the operating magnetic drive, housing 12 may further comprise one or more pressure equalization vents 46 allowing passage of gas but not passage of liquid into and out of housing 12. By way of non-limiting example, GORE® pressure vents supplied by W. L. Gore & Associates, Inc. are suitable for use as pressure equalization vents 46.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A magnetic drive assembly comprising:
 a housing including a cylindrical end bell portion having a first radius, a cylindrical hub portion at an open end of the end bell portion, the hub portion having a second radius greater than the first radius, a mounting tab extending radially outward from the hub portion, the mounting tab including a fastener hole; and at least one heat transfer fin contacting the hub portion and the mounting tab;
 a stator assembly received in the end bell portion;
 a rotor assembly including a hub having a ring-shaped recess located in the hub portion of the housing; and
 a drive ring magnet carried in the recess of the hub.

2. The magnetic drive assembly according to claim 1, wherein the at least one heat transfer fin includes a plurality of first heat transfer fins each having an axially extending edge contacting the hub portion, and a plurality of second heat transfer fins each having an axially extending edge contacting the end bell portion.

3. The magnetic drive assembly according to claim 2, wherein the plurality of first heat transfer fins each have a radially extending edge contacting the mounting tab.

4. The magnetic drive assembly according to claim 2, wherein the plurality of second heat transfer fins each have a radially extending edge contacting the hub portion and the mounting tab.

5. The magnetic drive assembly according to claim 3, wherein the plurality of second heat transfer fins each have a radially extending edge contacting the hub portion and the mounting tab.

6. The magnetic drive assembly according to claim 5, wherein the plurality of first heat transfer fins form a gusset support between the hub portion and the mounting tab, and the plurality of second heat transfer fins form a gusset support between the end bell portion and the mounting tab.

7. The magnetic drive assembly according to claim 5, wherein the plurality of first heat transfer fins are arranged on an opposite side of the mounting tab relative to the plurality of second heat transfer fins.

8. The magnetic drive assembly according to claim 1, further comprising at least one pressure equalization vent allowing passage of gas but not passage of liquid into and out of the housing.

9. The magnetic drive assembly according to claim 1, wherein the housing comprises a plurality of the mounting tabs.

10. A housing for a magnetic drive motor, the housing comprising:
 a cylindrical end bell portion having a first radius;
 a cylindrical hub portion at an open end of the end bell portion, the hub portion having a second radius greater than the first radius;
 a mounting tab extending radially outward from the hub portion, the mounting tab including a fastener hole; and
 at least one heat transfer fin contacting the hub portion and the mounting tab;

wherein the at least one heat transfer fin includes a plurality of first heat transfer fins each having an axially extending edge contacting the hub portion, and a plurality of second heat transfer fins each having an axially extending edge contacting the end bell portion; and wherein the plurality of second heat transfer fins each have a radially extending edge contacting the hub portion and the mounting tab.

11. The motor housing according to claim 10, further comprising at least one pressure equalization vent allowing passage of gas but not passage of liquid into and out of the housing.

12. The motor housing according to claim 10, wherein the housing comprises a plurality of the mounting tabs.

13. A housing for a magnetic drive motor, the housing comprising:
- a cylindrical end bell portion having a first radius;
- a cylindrical hub portion at an open end of the end bell portion, the hub portion having a second radius greater than the first radius;
- a mounting tab extending radially outward from the hub portion, the mounting tab including a fastener hole; and
- at least one heat transfer fin contacting the hub portion and the mounting tab;

wherein the at least one heat transfer fin includes a plurality of first heat transfer fins each having an axially extending edge contacting the hub portion, and a plurality of second heat transfer fins each having an axially extending edge contacting the end bell portion;

wherein the plurality of first heat transfer fins each have a radially extending edge contacting the mounting tab; and wherein the plurality of second heat transfer fins each have a radially extending edge contacting the hub portion and the mounting tab.

14. The motor housing according to claim 13, wherein the plurality of first heat transfer fins form a gusset support between the hub portion and the mounting tab, and the plurality of second heat transfer fins form a gusset support between the end bell portion and the mounting tab.

15. The motor housing according to claim 13, wherein the plurality of first heat transfer fins are arranged on an opposite side of the mounting tab relative to the plurality of second heat transfer fins.

16. The motor housing according to claim 13, further comprising at least one pressure equalization vent allowing passage of gas but not passage of liquid into and out of the housing.

17. The motor housing according to claim 13, wherein the housing comprises a plurality of the mounting tabs.

* * * * *